United States Patent
Han

(10) Patent No.: US 10,161,327 B2
(45) Date of Patent: Dec. 25, 2018

(54) ENGINE SYSTEM FOR VEHICLE

(71) Applicant: Hyundai Motor Company, Seoul (KR)

(72) Inventor: Kyoungchan Han, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 168 days.

(21) Appl. No.: 15/221,884

(22) Filed: Jul. 28, 2016

(65) Prior Publication Data

US 2017/0159590 A1 Jun. 8, 2017

(30) Foreign Application Priority Data

Dec. 8, 2015 (KR) .................. 10-2015-0174452

(51) Int. Cl.
*F02D 45/00* (2006.01)
*F02D 41/00* (2006.01)
*F16D 48/06* (2006.01)

(52) U.S. Cl.
CPC ......... *F02D 41/0087* (2013.01); *F16D 48/06* (2013.01); *B60Y 2300/205* (2013.01); *B60Y 2300/43* (2013.01); *B60Y 2300/47* (2013.01); *B60Y 2300/52* (2013.01); *F16D 2500/104* (2013.01)

(58) Field of Classification Search
CPC ............... F02D 41/00887; F16D 48/06; F16D 2500/104; B60Y 2300/205; B60Y 2300/43; B60Y 2300/52
USPC ................... 123/198 F, 192.1, 192.2
See application file for complete search history.

(56) References Cited

U.S. PATENT DOCUMENTS

| | | | | |
|---|---|---|---|---|
| 5,765,451 A | * | 6/1998 | Carone | .................. F02B 75/224 123/197.3 |
| 6,401,853 B1 | * | 6/2002 | Turski | ................. F02D 41/0087 180/197 |
| 2009/0150043 A1 | * | 6/2009 | Eriksson | ................. F02D 25/02 701/102 |
| 2016/0115863 A1 | * | 4/2016 | Gitelis | .................... F02B 55/02 123/246 |

FOREIGN PATENT DOCUMENTS

| | | |
|---|---|---|
| JP | 61-149648 A | 7/1986 |
| JP | 6-26360 A | 2/1994 |
| JP | 7-6545 U | 1/1995 |
| JP | 11-44231 A | 2/1999 |

* cited by examiner

*Primary Examiner* — Marguerite McMahon
(74) *Attorney, Agent, or Firm* — Morgan, Lewis & Bockius LLP

(57) ABSTRACT

An engine system for a vehicle may include an engine including a plurality of cylinders connected to a crankshaft, a Cylinder Deactivation (CDA) apparatus provided to at least one cylinder among the plurality of cylinders of the engine, a first flywheel mounted on the crankshaft, a second flywheel having a rotation center formed eccentrically with respect to the crankshaft by being disposed at a position corresponding to the cylinder including the CDA apparatus, and a clutch provided to the crankshaft to selectively transmit a torque of the crankshaft to the second flywheel during operation of the CDA apparatus.

12 Claims, 6 Drawing Sheets

ENGINE SYSTEM FOR VEHICLE

CROSS-REFERENCE TO RELATED APPLICATION

The present application claims priority to Korean Patent Application No. 10-2015-0174452, filed Dec. 8, 2015, the entire contents of which is incorporated herein for all purposes by this reference.

BACKGROUND OF THE INVENTION

Field of the Invention

The present invention relates to an engine system for a vehicle. More particularly, the present invention relates to an engine system for a vehicle that efficiently reduces a vibration of the engine generated due to an imbalance of rotational inertia during a valve idle in a diesel engine applied with a Cylinder Deactivation (CDA) function.

Description of Related Art

In general, internal combustion engines generate power by receiving and burning air and fuel in a combustion chamber.

That is, an intake valve is operated by a camshaft, and air is charged into the combustion chamber while an intake valve is open. An exhaust valve is also operated by a camshaft, and air is discharged from the combustion chamber while an exhaust valve is open.

The operation of the intake valve and the exhaust valve is changed depending on the rotation speed of the engine. That is, an appropriate lift or valve opening/closing time is changed depending on the rotation speed of the engine.

In order to implement appropriate valve operations according to rotation speeds of an engine, a variable valve lift (VVL) apparatus including a plurality of cams designed to have various shapes and driving a valve to be operated at different lifts according to RPM of an engine has been studied.

Also, a Cylinder Deactivation (CDA) apparatus selectively blocking combustion of some of the cylinders has been researched.

Here, the CDA apparatus deactivates some cylinders when the vehicle brakes or is driven with a constant speed, and during the operation of the CDA, the fuel supply to a deactivated cylinder to be a subject of the idle condition and the operation of intake/exhaust valves thereof are stopped.

In addition, due to regulations on carbon dioxide, vehicle makers are developing environmentally friendly diesel vehicles. The diesel engine has been known to have lower fuel consumption and better efficiency than the gasoline engine. In general, about a 40% better degree of efficiency occurs due to a high compression ratio of the diesel engine.

The diesel engine may also be applied with the CDA (Cylinder Deactivation) apparatus selectively blocking the combustion of some cylinders.

However, in the diesel engine applied with the CDA apparatus, if the function of the cylinder to be subjected to deactivation is stopped, a variation of rotational angular acceleration increases due to an imbalance of the rotational inertia between the cylinders, such that vibration of the engine is transmitted to the vehicle body such that the ride comfort is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system for a vehicle that improves ride comfort by efficiently reducing the vibration of the engine generated due to the imbalance of the rotational inertia during the cylinder deactivation to minimize the vibration in the diesel engine applied with the CDA (Cylinder Deactivation) function.

According to various aspects of the present invention, an engine system for a vehicle may include an engine including a plurality of cylinders connected to a crankshaft, a Cylinder Deactivation (CDA) apparatus provided to at least one cylinder among the plurality of cylinders of the engine, a first flywheel mounted on the crankshaft, a second flywheel having a rotation center formed eccentrically with respect to the crankshaft by being disposed at a position corresponding to the cylinder including the CDA apparatus, and a clutch provided to the crankshaft to selectively transmit a torque of the crankshaft to the second flywheel during operation of the CDA apparatus.

The first flywheel may be positioned at a first end part of the engine, and the second flywheel may be positioned at a second end part of the engine.

The clutch may be disposed on the crankshaft between the engine and the second flywheel.

The first flywheel may be positioned at a first end part of the engine, and the second flywheel may be mounted on the crankshaft at a position separated from the first flywheel.

The clutch may be disposed on the crankshaft between the first flywheel and the second flywheel.

The crankshaft may be mounted at a rotation center of the first flywheel.

The second flywheel may be mounted for a rotation center thereof to be eccentrically disposed such that a mass center thereof is disposed on a same axis as a mass center of a balance weight provided at the crankshaft corresponding to the cylinder without the CDA apparatus.

According to various aspects of the present invention, an engine system for a vehicle may include an engine having a plurality of cylinders connected to a crankshaft provided with a balance weight, a Cylinder Deactivation (CDA) apparatus provided to at least one cylinder among the plurality of cylinders of the engine, a first flywheel having a rotation center formed eccentrically with respect to the crankshaft by corresponding to a position of a cylinder without the CDA apparatus, a second flywheel having a rotation center formed eccentrically with respect to the crankshaft by corresponding to a position of a cylinder provided with the CDA apparatus, and a clutch provided to the crankshaft to selectively prevent a torque of the crankshaft from being transmitted to the second flywheel during operation of the CDA apparatus.

The first flywheel may be mounted on the crankshaft for a mass center thereof to be positioned in the direction opposite to a mass center of the second flywheel.

The first flywheel may be positioned at one end part of the engine, and the second flywheel may be mounted on the crankshaft at the position separated from the first flywheel.

The rotation center of the first flywheel may be formed eccentrically with respect to the crankshaft such that a mass center of the first flywheel is positioned to be toward a mass center of the balance weight positioned at the cylinder having the CDA apparatus, and the rotation center of the second flywheel may be formed eccentrically with respect to the crankshaft such that a mass center of the second flywheel is positioned to be toward the mass center of the balance weight positioned at the cylinder without the CDA apparatus.

The mass centers of the first flywheel and the second flywheel may be symmetrical to each other in opposite directions with reference to an axis direction of the crankshaft.

As described above, according to an engine system for a vehicle according to various embodiments of the present invention, ride comfort may be improved by efficiently reducing the vibration of the engine generated due to the imbalance of the rotational inertia during the cylinder deactivation to minimize the vibration in the diesel engine applied with the Cylinder Deactivation (CDA) function.

Also, by realizing the cylinder deactivation without the vibration generation depending on the running state of the vehicle, unnecessary fuel consumption may be prevented such that the fuel consumption may be improved and the exhaust gas may be reduced, thereby improving the overall marketability of the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
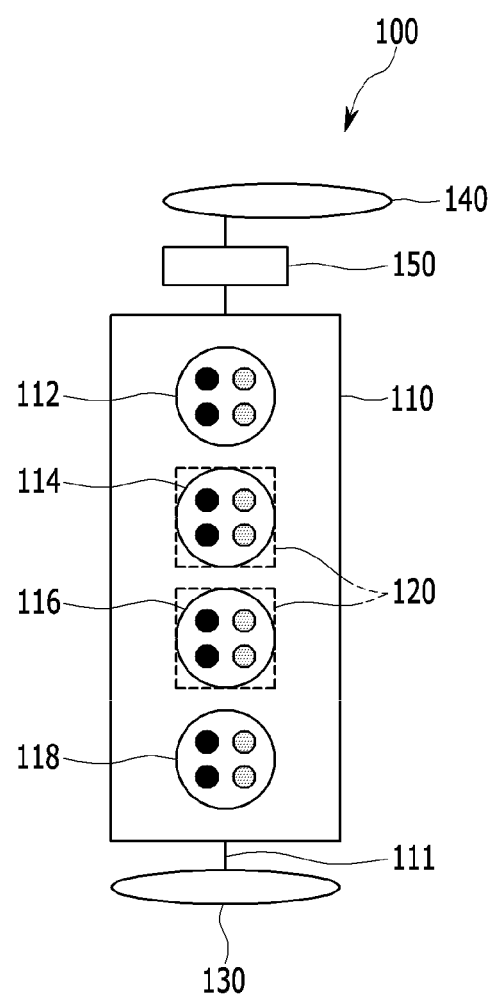
FIG. 1 is a schematic diagram of an exemplary engine system for a vehicle according to the present invention.
Figure 2:
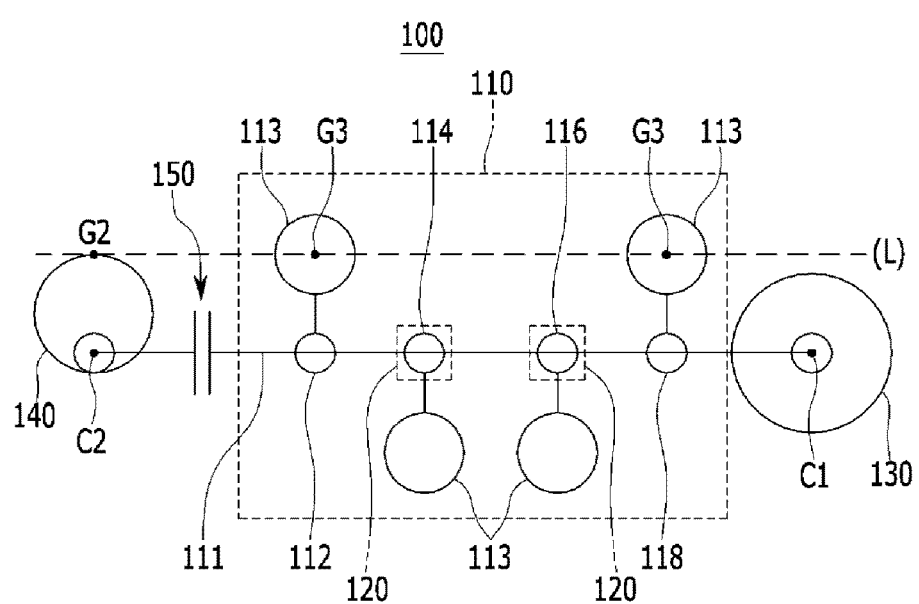
FIG. 2 is a schematic diagram of the exemplary engine system for the vehicle of FIG. 1 according to the present invention.

FIG. 1 is a schematic diagram of an engine system for a vehicle according to various embodiments of the present invention, and FIG. 2 is a schematic diagram of an engine system for a vehicle according to various embodiments of the present invention.

The engine system 100 for a vehicle according to various embodiments of the present invention prevents the engine vibration generated by the cylinder of which the operation is stopped from being transmitted to the vehicle body when a CDA apparatus 120 is operated in an engine 110 of the diesel vehicle including the CDA apparatus 120. For this, the engine system 100 for a vehicle according to various embodiments of the present invention, as shown in FIG. 1 and FIG. 2, includes the engine 110, the CDA (Cylinder Deactivation) apparatus 120, first and second flywheels 130 and 140, and a clutch apparatus 150. The engine 110 includes first, second, third, and fourth cylinders 112, 114, 116, and 118 connected to a crankshaft 111. The Cylinder Deactivation (CDA) apparatus 120 is provided to the second and third cylinders 114 and 116 among the cylinders 112, 114, 116, and 118 of the engine 110. In the case that the CDA apparatus 120 is operated during the driving of the vehicle, the operation of the second cylinder 114 and the third cylinder 116 may be stopped.

In the various embodiments of FIGS. 1 and 2 of the present invention, the first flywheel 130 is mounted on the crankshaft 111. Here, the crankshaft 111 may be mounted on the rotation center C1 of the first flywheel 130. The second flywheel 140 is mounted for the rotation center C2 to be eccentric to the crankshaft 111 by corresponding to the second and third cylinders 114 and 116 including the CDA apparatus 120.

The second flywheel 140 may be mounted for the rotation center C2 thereof to be eccentric such that the mass center G2 thereof is disposed on the same axis line L as the mass center G3 of a balance weight 113 provided to the crankshaft 111 by corresponding to the first and fourth cylinders 112 and 118 without the CDA apparatus 120.

The first flywheel 130 may be positioned at one end part of the engine 110 at which the fourth cylinder 118 is positioned, and the second flywheel 140 may be positioned at the other end part of the engine 110 at which the first cylinder 112 is positioned. The clutch apparatus 150 is provided at the crankshaft 111, thereby selectively transmitting the torque of the crankshaft 111 to the second flywheel 140 during the operating of the CDA apparatus 120. The clutch apparatus 150 may be disposed at the crankshaft 111 between the engine 110 and the second flywheel 140. This configured engine system 100 stops the operation of the second and third cylinders 114 and 116 during the operating of the CDA apparatus 120.

Thus, the torque is not generated in the deactivated second and third cylinders 114 and 116, and the torque is only generated in the first and fourth cylinders 112 and 118. Accordingly, the imbalance of the rotational inertia is respectively generated between the cylinders 112, 114, 116, and 118 and the change amount of the rotational angular acceleration is increased. Accordingly, serious vibration is generated in the engine 111. The clutch apparatus 150 is operated to transmit the torque of the crankshaft 111 to the second flywheel 140. Thus, to position the mass center G2 of the second flywheel 140 to the side of the mass center G3 of the balance weight 113 positioned with the first and fourth cylinders 112 and 118, the second flywheel 140 eccentrically mounted with respect to the crankshaft 111 is rotated in the eccentric state with reference to the rotation center C2 thereof. In this case, the eccentrically rotated second flywheel 140 offsets the imbalance of the rotational inertia generated by the operation of the first and fourth cylinders 112 and 118 such that the change amount of the rotational angular acceleration is decreased. Accordingly, the vibration generated from the engine 110 is offset and is prevented from being transmitted to the vehicle body.

Figure 3:
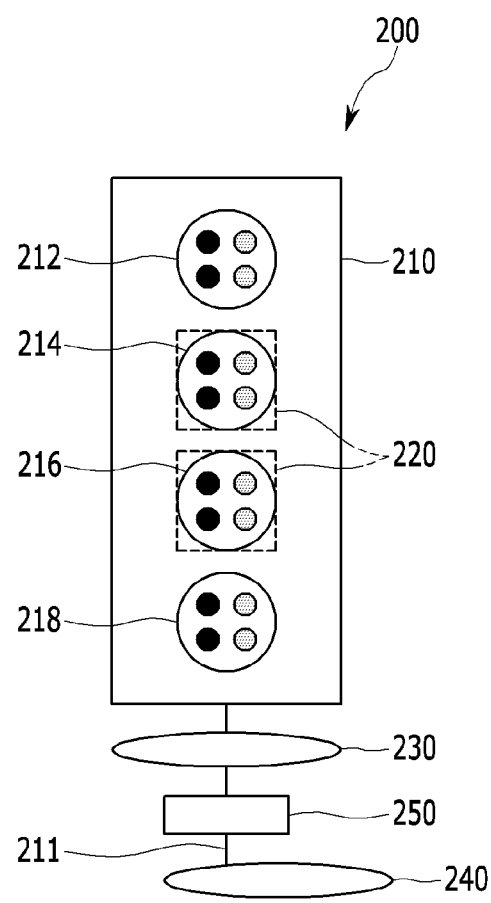
FIG. 3 is a schematic diagram of an exemplary engine system for a vehicle according to the present invention.

FIG. 3 is a schematic diagram of an engine system for a vehicle according to various embodiments of the present invention. Referring to FIG. 3, the engine system 200 for the vehicle according to the various embodiments of the present invention prevents the engine vibration generated by the cylinder of which the operation is stopped from being transmitted to the vehicle body when a CDA apparatus 220 is operated in the engine 210 of the diesel vehicle including the CDA apparatus 220 like the various embodiments of FIGS. 1 and 2.

For this, the engine system 200 for a vehicle according to the various embodiments of FIG. 3, includes the engine 210, the CDA apparatus 220, the first and second flywheels 230 and 240, and the clutch apparatus 250. The engine 210 includes the first, second, third, and fourth cylinders 212, 214, 216, and 218 connected to the crankshaft 211. The CDA apparatus 220 is provided to the second and third cylinders 214 and 216 among the cylinders 212, 214, 216, and 218 of the engine 210. In the case that the CDA apparatus 220 is operated during the driving of the vehicle, the operation of the second cylinder 214 and the third cylinder 216 may be stopped.

In the various embodiments of the present invention illustrated in FIG. 3, the first flywheel 230 is mounted on the crankshaft 211. Here, the crankshaft 211 may be mounted on the rotation center (referring to C1 of FIG. 2) of the first flywheel 230. The second flywheel 240 is mounted for the rotation center (referring to C1 of FIG. 2) to be eccentric to the crankshaft 211 by corresponding to the second and third cylinders 214 and 216 including the CDA apparatus 220. As described above, the second flywheel 240 according to the various embodiments of the present invention illustrated in FIG. 3 is mounted to the crankshaft 211 like the various embodiment of the present invention illustrated in FIGS. 1 and 2, such that the detailed description thereof is omitted.

In the various embodiments of the present invention illustrated in FIG. 3, the first flywheel 230 may be positioned at one end part of the engine 210 at which the fourth cylinder 218 is positioned, and the second flywheel 240 may be mounted to the crankshaft 211 at the position separated from the first flywheel 230. That is, the second flywheel 240 is mounted at the position separated from the first flywheel 230 at one end part of the engine 210 at which the fourth cylinder 218 is positioned. The clutch apparatus 250 may be provided to the crankshaft 211 between the first flywheel 230 and the second flywheel 240 to transmit the torque of the crankshaft 211 to the second flywheel 240 during the operation of the CDA apparatus 220. The engine system 200 for the vehicle according to the various embodiments of the present invention illustrated in FIG. 3 is the same as the above-described various embodiments of the present invention illustrated in FIGS. 1 and 2, such that the detailed description for the operation thereof is omitted.

Figure 4:
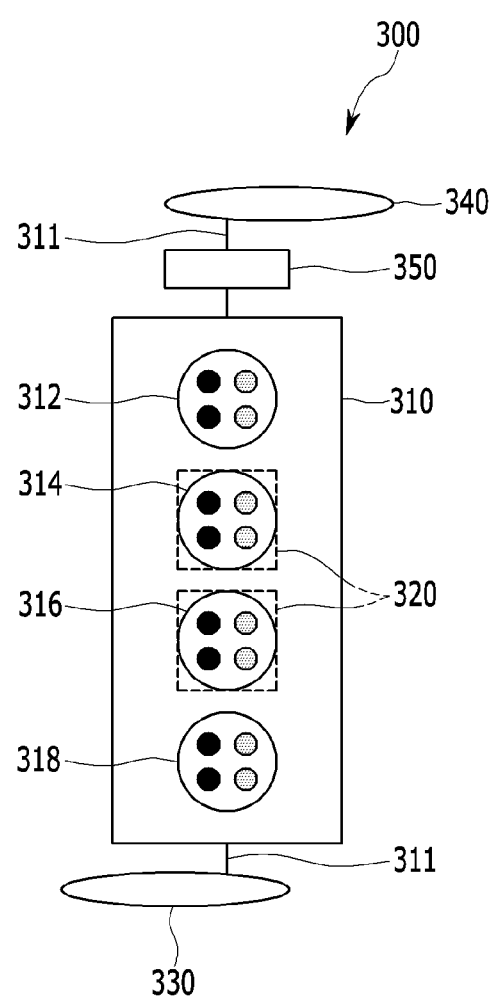
FIG. 4 is a schematic diagram of an exemplary engine system for a vehicle according to the present invention.
Figure 5:
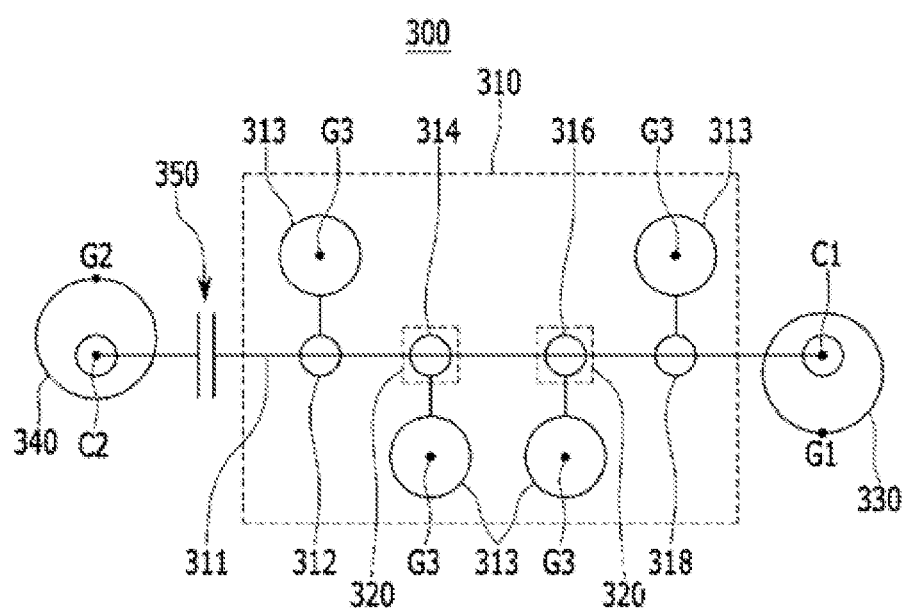
FIG. 5 is a configuration diagram of the exemplary engine system for the vehicle of FIG. 4 according to the present invention.

FIG. 4 is a schematic diagram of an engine system for a vehicle according to various embodiments of the present invention, and FIG. 5 is a configuration diagram of an engine system for a vehicle according to the various embodiments illustrated in FIG. 4. The engine system 300 for a vehicle according to the various embodiments of the present invention illustrated in FIGS. 4 and 5 prevents the engine vibration generated by the cylinder of which the operation is stopped from being transmitted to the vehicle body when a CDA apparatus 320 is operated in the engine 310 of the diesel vehicle including the CDA apparatus 320. For this, the engine system 300 for a vehicle according to various embodiments of the present invention illustrated in FIG. 4 and FIG. 5, includes the engine 310, the CDA apparatus 320, the first and second flywheels 330 and 340, and the clutch apparatus 350.

First, the engine 310 includes first, second, third, and fourth cylinders 312, 314, 316, and 318 connected to the crankshaft 311. The CDA apparatus 320 is provided to the second and third cylinders 314 and 316 among the cylinders 312, 314, 316, and 318 of the engine 310. In the case that the CDA apparatus 320 is operated during the driving of the vehicle, the operation of the second cylinder 314 and the third cylinder 316 may be stopped.

In the various embodiments of the present invention illustrated in FIGS. 4 and 5, the first flywheel 330 may be mounted such that the rotation center C1 is eccentrically formed with respect to the crankshaft 311 by corresponding to the first and fourth cylinders 312 and 318 without the CDA apparatus 320. That is, the rotation center C1 of the first flywheel 330 is formed eccentrically with respect to the crankshaft 311 such that the mass center G1 of the first flywheel 330 is positioned toward the mass center G3 of the balance weight 313 positioned at the second and third cylinders 314 and 316 provided with the CDA apparatus 320. The second flywheel 340 is mounted such that the rotation center C2 is formed eccentrically with respect to the crankshaft 311 corresponding to the second and third cylinders 314 and 316 provided with the CDA apparatus 320.

The rotation center G2 of the second flywheel 340 may be formed eccentrically with respect to the crankshaft 311 for the mass center G2 of the second flywheel 340 to be positioned toward the mass center G3 of the balance weight 313 positioned at the first and fourth cylinders 314 and 318 without the CDA apparatus 320. Accordingly, the first flywheel 330 is mounted to the crankshaft to position the mass center G1 thereof in the opposite direction to the mass center G2 of the second flywheel 340. Therefore, the mass centers G1 and G2 of the first flywheel 330 and the second flywheel 340 may be symmetric in the opposite directions to each other with reference to an axis direction of the crankshaft 311.

Here, the first flywheel 330 may be positioned at one end part of the engine 310 positioned with the fourth cylinder 318, and the second flywheel 340 may be positioned at the other end part of the engine 310 positioned with the first cylinder 312. Also, the clutch apparatus 350 is provided at the crankshaft 311 and selectively prevents the torque of the crankshaft 311 from being transmitted to the second flywheel 340 during the operation of the CDA apparatus 320. That is, in the various embodiments of the present invention illustrated in FIGS. 4 and 5, the clutch apparatus 350 may be maintained in the state such that the torque of the crankshaft 311 is transmitted to the second flywheel 340 until the CDA apparatus 320 is operated. The clutch apparatus 350 may be disposed at the crankshaft 311 between the engine 310 and the second flywheel 340.

In the configured engine system 300, when the CDA apparatus 320 is not operated, the clutch apparatus 350 is maintained in the operated state to transmit the torque of the crankshaft 311 to the second flywheel 340. In this state, if the CDA apparatus 320 is operated, the operation of the second and third cylinders 314 and 316 is stopped. Thus, the torque is not generated in the deactivated second and third cylinders 314 and 316, and the torque is only generated in the first and fourth cylinders 312 and 318. Accordingly, imbalance of the rotational inertia between the cylinders 312, 314, 316, and 318 is generated and the change amount of the rotational angular acceleration is increased. Accordingly, serious vibration is generated in the engine 310.

Here, the operation of the clutch apparatus 350 is stopped to not transmit the torque of the crankshaft 311 to the second flywheel 340. Thus, the first flywheel 330 mounted for the mass center G1 to be positioned in the direction opposite to the mass center G3 of the balance weight 313 at which the first and fourth cylinders 312 and 318 are positioned is rotated in the eccentric state with reference to the rotation center C1 thereof. In this case, the eccentrically rotated first flywheel 340 offsets the imbalance of the rotational inertia generated by the operation of the first and fourth cylinders 312 and 318 to reduce the change amount of the rotational angular acceleration. Accordingly, the vibration generated from the engine 310 is offset to be prevented from being transmitted to the vehicle body.

Figure 6:
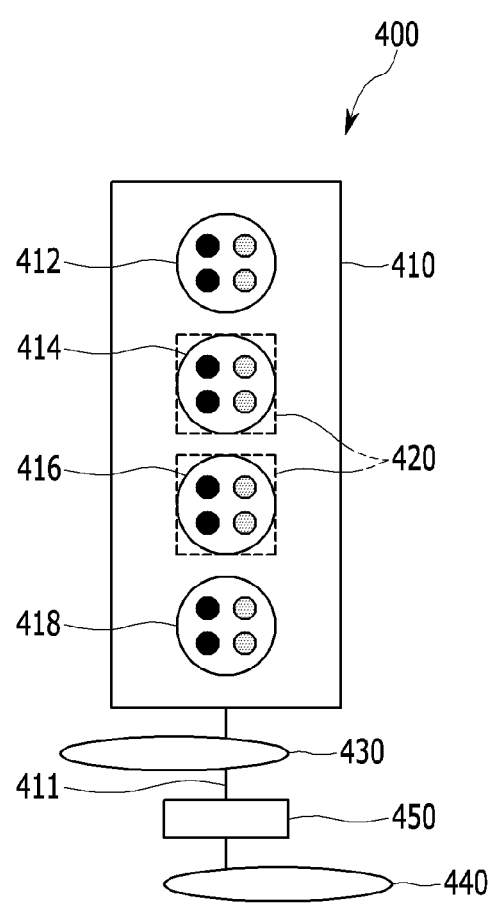
FIG. 6 is a schematic diagram of an exemplary engine system for a vehicle according to the present invention.

FIG. 6 is a schematic diagram of an exemplary engine system for a vehicle according to various embodiments of the present invention. The engine system 400 for a vehicle according to the various embodiments of the present invention illustrated in FIG. 6 prevents the engine vibration generated by the cylinder of which the operation is stopped from being transmitted to the vehicle body when a CDA apparatus 420 is operated in an engine 410 of a diesel vehicle including the CDA apparatus 420, like the above-described various embodiments of the present invention illustrated in FIGS. 4 and 5.

For this, the engine system 400 for the vehicle according to the various embodiments of the present invention illustrated in FIG. 6, includes the engine 410, the CDA apparatus 420, the first and second flywheels 430 and 440, and the clutch apparatus 450. First, the engine 410 includes first, second, third, and fourth cylinders 412, 414, 416, and 418 connected to the crankshaft 411. The CDA apparatus 420 is provided to the second and third cylinders 414 and 416 among the cylinders 412, 414, 416, and 418 of the engine 410. In the case that the CDA apparatus 420 is operated during the driving of the vehicle, the operation of the second cylinder 414 and the third cylinder 416 may be stopped.

In the various embodiments of the present invention illustrated in FIG. 6, the first flywheel 430 may be mounted such that rotation center (referring to C1 of FIG. 5) is eccentrically formed with respect to the crankshaft 411 by corresponding to the first and fourth cylinders 412 and 418 without the CDA apparatus 420. The second flywheel 440 is mounted such that the rotation center (C2, referring to FIG. 5) is formed eccentrically with respect to the crankshaft 411 corresponding to the second and third cylinders 414 and 416 provided with the CDA apparatus 420. As described above, the first flywheel 430 and the second flywheel 440 according to the various embodiments of the present invention illustrated in FIG. 6 are mounted to the crankshaft 411 like the various embodiments of the present invention illustrated in FIGS. 4 and 5 such that the detailed description thereof is omitted.

In the various embodiments of the present invention illustrated in FIG. 6, the first flywheel 430 may be positioned at one end part of the engine 410 at which the fourth cylinder 418 is positioned, and the second flywheel 440 may be mounted to the crankshaft 411 at the position separated from the first flywheel 430. That is, the second flywheel 440 is mounted at the position separated from the first flywheel 430 at one end part of the engine 410 at which the fourth cylinder 418 is positioned. Also, the clutch apparatus 450 may be provided on the crankshaft 411 between the first flywheel 430 and the second flywheel 440 to selectively prevent the torque of the crankshaft 411 from being transmitted to the second flywheel 440 during the operation of the CDA apparatus 420.

That is, in the various embodiments of the present invention illustrated in FIG. 6, the clutch apparatus 450 may be maintained in the state such that the torque of the crankshaft 411 is transmitted to the second flywheel 440 until the CDA apparatus 420 is operated. The operation of the engine system 400 for a vehicle according to the various embodiments of the present invention illustrated in FIG. 6 is the same as that of the various embodiments of the present invention illustrated in FIGS. 1 and 2 such that the detailed description for the operation thereof is omitted.

Accordingly, if the engine systems (100, 200, 300, and 400) for a vehicle according to the various embodiments of the present invention are applied during the valve idle in the diesel engine provided with the CDA apparatus (120, 220, 320, and 420), the vibration of the engine (110, 210, 310, and 410) by the imbalance of the rotational inertia may be efficiently reduced, thereby the vibration generation may be minimized and the ride comfort may be improved.

Also, by realizing the cylinder deactivation without the vibration generation depending on the running state of the vehicle, the unnecessary fuel consumption may be prevented such that overall fuel consumption may be improved and the exhaust gas may be reduced, thereby improving the overall marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. An engine system for a vehicle, comprising:
   an engine including a plurality of cylinders connected to a crankshaft;

a Cylinder Deactivation (CDA) apparatus provided to at least one cylinder among the plurality of cylinders of the engine;

a first flywheel mounted on the crankshaft;

a second flywheel having a mass center formed eccentrically with respect to the crankshaft wherein the mass center of the second flywheel is disposed at an opposite side of the crankshaft from where a mass center of a balance weight of the at least one cylinder including the CDA apparatus is disposed; and a clutch provided to the crankshaft to selectively transmit a torque of the crankshaft to the second flywheel during operation of the CDA apparatus, wherein the first flywheel is positioned at a first end part of the engine, and the second flywheel is positioned at a second end part of the engine.

2. The engine system for the vehicle of claim 1, wherein the clutch is disposed on the crankshaft between the engine and the second flywheel.

3. The engine system for the vehicle of claim 1, wherein the crankshaft is mounted at a rotation center of the first flywheel.

4. The engine system for the vehicle of claim 1, wherein the second flywheel is mounted for the mass center thereof to be eccentrically disposed such that the mass center thereof is disposed on a same axis as a mass center of a balance weight of a cylinder provided at the crankshaft without the CDA apparatus among the plurality of cylinders.

5. An engine system for a vehicle, comprising:

an engine including a plurality of cylinders connected to a crankshaft;

a Cylinder Deactivation (CDA) apparatus provided to at least one cylinder among the plurality of cylinders of the engine;

a first flywheel mounted on the crankshaft;

a second flywheel having a mass center formed eccentrically with respect to the crankshaft, wherein the mass center of the second flywheel is disposed at an opposite side of the crankshaft from where a mass center of a balance weight of the at least one cylinder including the CDA apparatus is disposed; and a clutch provided to the crankshaft to selectively transmit a torque of the crankshaft to the second flywheel during operation of the CDA apparatus, wherein the first flywheel is positioned at a first end part of the engine, and the second flywheel is mounted on the crankshaft at a position separated from the first flywheel, and wherein the clutch is disposed on the crankshaft between the first flywheel and the second flywheel.

6. An engine system for a vehicle, comprising:

an engine including a plurality of cylinders connected to a crankshaft and provided with a balance weight wherein the plurality of cylinders includes at least one cylinder provided with a Cylinder Deactivation (CDA) apparatus and at least one cylinder provided without the Cylinder Deactivation (CDA) apparatus;

a first flywheel having a mass center formed eccentrically with respect to the crankshaft, wherein the mass center of the first flywheel is disposed at a side of the crankshaft where a mass center of the cylinder with the CDA apparatus is disposed;

a second flywheel having a mass center formed eccentrically with respect to the crankshaft wherein the mass center of the second flywheel is disposed at a side of the crankshaft where the balance weight of the at least one cylinder provided without the CDA apparatus is disposed; and a clutch provided to the crankshaft to selectively prevent a torque of the crankshaft from being transmitted to the second flywheel during operation of the CDA apparatus, wherein the mass centers of the first flywheel and the second flywheel are symmetrical to each other in opposite directions with reference to an axis direction of the crankshaft.

7. The engine system for the vehicle of claim 6, wherein the first flywheel is positioned at a first end part of the engine, and the second flywheel is positioned at a second end part of the engine.

8. The engine system for the vehicle of claim 7, wherein the clutch is disposed on the crankshaft between the engine and the second flywheel.

9. The engine system for the vehicle of claim 6, wherein the first flywheel is mounted on the crankshaft for the mass center thereof to be positioned in the direction opposite to the mass center of the second flywheel.

10. The engine system for the vehicle of claim 6, wherein the first flywheel is positioned at one end part of the engine, and the second flywheel is mounted on the crankshaft at a position separated from the first flywheel.

11. The engine system for the vehicle of claim 10, wherein the clutch is provided on the crankshaft between the first flywheel and the second flywheel.

12. The engine system for the vehicle of claim 6, wherein the rotation center of the first flywheel is formed eccentrically with respect to the crankshaft such that a mass center of the first flywheel is positioned to be toward a mass center of the balance weight positioned at the cylinder having the CDA apparatus, and the rotation center of the second flywheel is formed eccentrically with respect to the crankshaft such that a mass center of the second flywheel is positioned to be toward the mass center of the balance weight positioned at the cylinder without the CDA apparatus.

* * * * *